United States Patent
Ohsawa

(10) Patent No.: US 6,934,231 B2
(45) Date of Patent: Aug. 23, 2005

(54) INFORMATION RECORDING MEDIUM, INFORMATION REPRODUCTION APPARATUS, AND INFORMATION RECORDING APPARATUS

(75) Inventor: Hideaki Ohsawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 10/132,469

(22) Filed: Apr. 26, 2002

(65) Prior Publication Data

US 2002/0159370 A1 Oct. 31, 2002

(30) Foreign Application Priority Data

Apr. 27, 2001 (JP) ........................................ 2001-133299

(51) Int. Cl.⁷ ................................................. G11B 7/00
(52) U.S. Cl. ................................ 369/53.14; 369/53.17; 369/53.42
(58) Field of Search ......................... 369/59.25, 275.3, 369/53.12, 53.14, 94, 53.17, 47.1

(56) References Cited

U.S. PATENT DOCUMENTS 6,424,614 B1 * 7/2002 Kawamura et al. ...... 369/275.3

FOREIGN PATENT DOCUMENTS

| JP | 11-144393 | * 5/1999 | .............. 369/275.3 |
| JP | 2000-36130 | 2/2000 | |

OTHER PUBLICATIONS

U.S. Appl. No. 10/132,469, filed Apr. 26, 2002, Ohsawa.
U.S. Appl. No. 10/668,209, filed Sep. 24, 2003, Hasegawa.

* cited by examiner

*Primary Examiner*—Nabil Hindi
(74) *Attorney, Agent, or Firm*—Oblon, Spivak, McClelland, Maier & Neustadt, P.C.

(57) ABSTRACT

An information recording medium according to an embodiment of this invention has a plurality of disk-like information recording layers, which are adhered to each other within an allowable decentering error range, and a data area assured on each information recording layer, and has guard tracks within the range of a predetermined radial distance from the radial position of the innermost periphery of the data area toward the outer periphery.

2 Claims, 5 Drawing Sheets

INFORMATION RECORDING MEDIUM, INFORMATION REPRODUCTION APPARATUS, AND INFORMATION RECORDING APPARATUS

CROSS-REFERENCE TO RELATED APPLICATIONS

This application is based upon and claims the benefit of priority from the prior Japanese Patent Application No. 2001-133299, filed Apr. 27, 2001, the entire contents of which are incorporated herein by reference.

BACKGROUND OF THE INVENTION

1. Field of the Invention

The present invention relates to an optical information recording medium having a plurality of information recording layers. The present invention also relates to an information reproduction apparatus for reproducing data from such information recording medium. Furthermore, the present invention relates to an information recording apparatus for recording information on such information recording medium.

2. Description of the Related Art

In recent years, a DVD having a capacity about 7 times that of a CD (compact disk) has been developed, and has become prevalent. DVD disks include read-only DVD-ROM disk, write-once DVD-R disk, rewritable DVD-RAM disk, and the like depending on their characteristics. The DVD disk has a lead-in zone that records sub information in addition to a data zone used to record main information.

JIS X 6243, which specifies the DVD-RAM disk, specifies a data zone and a lead-in zone which is located on the inner periphery side of the data zone. The data zone is a data-rewritable main information recording area. On the other hand, the lead-in zone is an area wherein sub information is recorded by embossed prepit trains. The sub information includes information of a disk structure, recording/reproduction parameters, and the like.

JIS X 6241, which specifies the DVD-ROM disk, specifies a disk having two layers per side. The disk having two layers per side has a larger capacity per side than a disk having one layer per side. In recent years, not only the ROM disk, but also a two-layered rewritable disk has been studied.

In order to realize a two-layered rewritable disk, the influence from the other layer (a layer on the back or front side viewed from the objective lens side) must be reduced. For example, Jpn. Pat. Appln. KOKAI Publication No. 2000-36130 has proposed a method of reducing such influence. Jpn. Pat. Appln. KOKAI Publication No. 2000-36130 describes that the relationship between the reflectance and light absorbency of first and second layers is limited, and the recording order with respect to the first and second layers is limited. In the recording order, information is recorded first on the first layer which is located on the front side viewed from the objective lens side, and is then on the second layer which is located on the back side viewed from the objective lens side. With such limitations, the influence from the other layer can be reduced, and recording/reproduction can be implemented.

However, upon realizing a two-layered rewritable disk, the influence from the other layer due to a decentering error poses another problem. The lead-in zone and data zone have different light reflectances and absorbencies. If the disk is free from any decentering errors, the lead-in zone and data zone in the first layer are formed at the same radial positions as those in the second layer. Therefore, a preventive measure can be taken while predicting influences from the other layer to some extent.

However, it is nearly impossible to manufacture a disk free from any decentering errors. For this reason, the radial positions of the lead-in zone and data zone in the first layer become slightly different from those in the second layer. Such slight difference seriously influences information reproduced near the boundary of the lead-in zone and data zone, resulting in unstable reproduction.

Jpn. Pat. Appln. KOKAI Publication No. 62-285232 discloses an optical disk in which guard areas which do not undergo any data recording/reproduction are formed before and after the boundary between a data read-only area and data recording area. However, this disk does not consider any preventive measure against decentering errors, and the above technique cannot solve the aforementioned problems.

BRIEF SUMMARY OF THE INVENTION

It is an object of the present invention to provide an information recording medium, information reproduction apparatus, and information recording apparatus, which can solve the aforementioned problems.

(1) An information recording medium according to an embodiment of the present invention comprises a plurality of disk-like information recording layers which are adhered to each other within an allowable decentering error range, each of the information recording layers comprises an embossed lead-in area which is located at a predetermined radial position and is recorded with lead-in data by embossed pits, and a data area which neighbors the embossed lead-in area, and is located on an outer periphery side of the embossed lead-in area, and the data area comprises guard tracks which are formed within a range of a predetermined radial distance from a radial position of an innermost periphery of the data area toward an outer periphery side, and data recording tracks which are formed on the outer periphery side of the guard tracks and are used to record phase change recording marks that reflect user data.

(2) An information reproduction apparatus according to an embodiment of the present invention comprises an irradiation section configured to irradiate the information recording medium with a light beam, and a reproduction section configured to receive the light beam reflected by an embossed lead-in area and data recording tracks on the information recording medium, and to reproduce data reflected in the reflected light beam, the information recording medium comprises a plurality of disk-like information recording layers which are adhered to each other within an allowable decentering error range, each of the information recording layers comprises the embossed lead-in area which is located at a predetermined radial position and is recorded with lead-in data by embossed pits, and a data area which neighbors the embossed lead-in area, and is located on an outer periphery side of the embossed lead-in area, and the data area comprises guard tracks which are formed within a range of a predetermined radial distance from a radial position of an innermost periphery of the data area toward an outer periphery side, and the data recording tracks which are formed on the outer periphery side of the guard tracks and are used to record phase change recording marks that reflect user data.

(3) An information recording apparatus according to an embodiment of the present invention comprises an irradiation section configured to irradiate the information recording medium with a light beam, and a recording section configured to irradiate data recording tracks on the information recording medium with the light beam to record data, the information recording medium comprises a plurality of disk-like information recording layers which are adhered to each other within an allowable decentering error range, each of the information recording layers comprises an embossed lead-in area which is located at a predetermined radial position and is recorded with lead-in data by embossed pits, and a data area which neighbors the embossed lead-in area, and is located on an outer periphery side of the embossed lead-in area, and the data area comprises guard tracks which are formed within a range of a predetermined radial distance from a radial position of an innermost periphery of the data area toward an outer periphery side, and the data recording tracks which are formed on the outer periphery side of the guard tracks and are used to record phase change recording marks that reflect user data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A preferred embodiment of the present invention will be described hereinafter with reference to the accompanying drawings.

Figure 9:
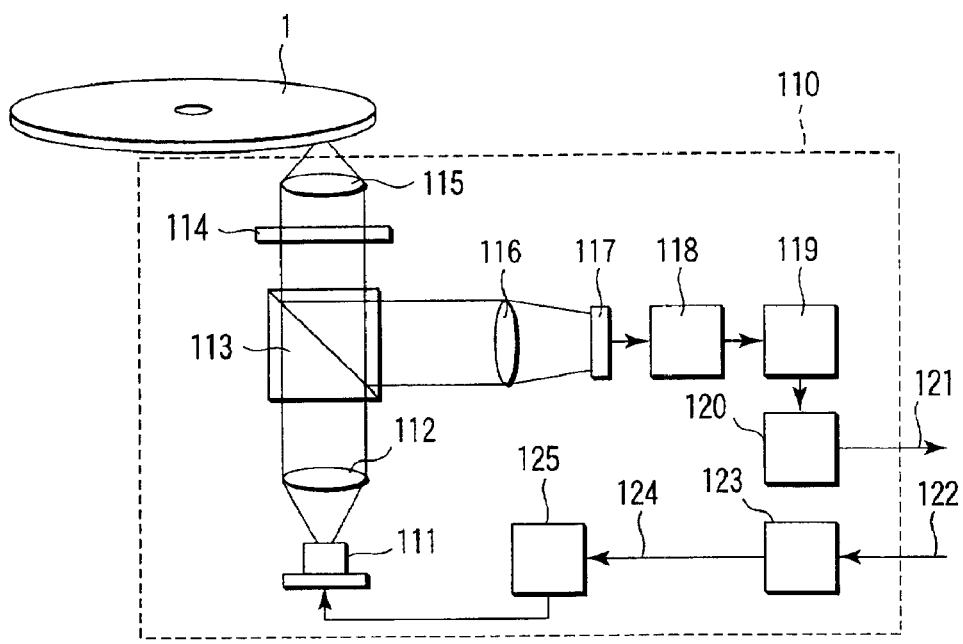
FIG. 9 is a block diagram showing an example of an information recording/reproduction apparatus.

FIG. 9 shows an information recording/reproduction apparatus according to an embodiment of the present invention. This information recording/reproduction apparatus records information on an information recording medium (optical disk 1) according to an embodiment of the present invention, and reproduces information recorded on that information recording medium.

As shown in FIG. 9, a light beam emitted by a laser beam source 111 is collimated by a collimator lens 112, and enters and is transmitted through a polarization beam splitter (to be referred to as PBS hereinafter) 113. The beam transmitted through the PBS 113 is transmitted through a quarter-wave plate 114, and is focused on the information recording surface of an optical disk 1 by an objective lens 115.

The focused beam is controlled by a focusing servo/tracking servo system to maintain a state wherein the best small beam spot is obtained on the recording surface. When there are a plurality of information recording surfaces like in the information recording medium according to an embodiment of the present invention, a surface which is to undergo recording/reproduction is selected by the focusing servo system, and the focused beam is maintained in a state wherein the best small beam spot is obtained on the selected surface.

The beam which hits the optical disk 1 is reflected by a reflection film in the information recording surface or a reflective recording film. The reflected light is transmitted through the objective lens 115 in the opposite direction, and is converted into collimated light again. The reflected light is transmitted through the quarter-wave plate 114. The reflected light has a plane of polarization perpendicular to that of the incoming light, and is reflected by the PBS 113. The beam reflected by the PBS 113 is converted into a convergent beam by a focusing lens 116, and then enters a photodetector 117. The light beam which has entered the photodetector 117 is photoelectrically converted into an electrical signal, which is sent to a preamplifier 118. The signal amplified by the preamplifier 118 is equalized and binarized by a signal processing circuit 119, and the processed signal is sent to a demodulation circuit 120. The signal is demodulated by the demodulation circuit 120, and is then output as reproduction data 121.

On the other hand, recording data (data symbol) 122 is modulated into a predetermined channel bit sequence by a modulation circuit 123. A bit sequence 124 corresponding to the recording data 122 is converted into a laser drive waveform by a recording control circuit 125. The recording control circuit 125 pulse-drives a laser 111, and records data corresponding to the desired bit sequence 124 on the optical disk 1.

Figure 4:
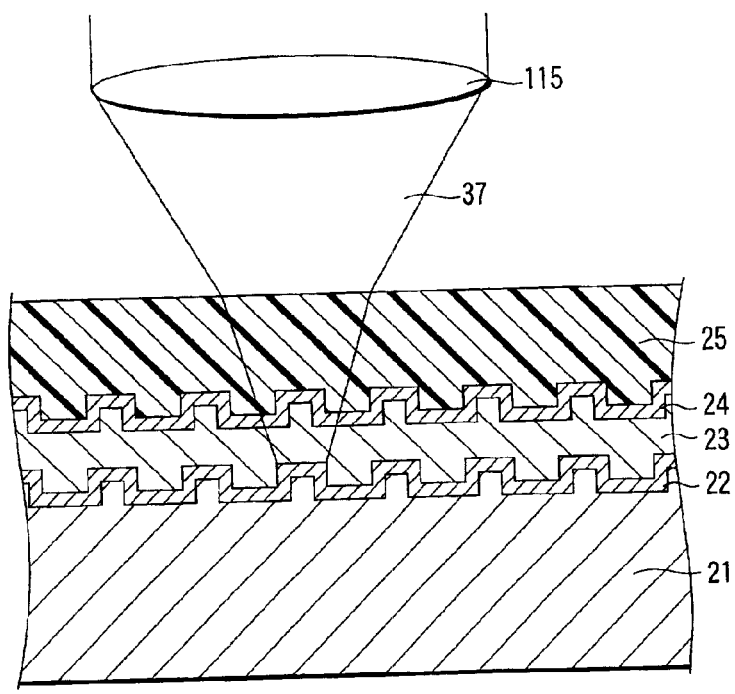
FIG. 4 is a sectional view of the information recording medium, and especially showing an example of an area where embossed prepits are formed.

FIG. 4 is a sectional view showing an example of the information recording medium. The information recording medium has a plurality of information recording layers. As shown in FIG. 4, a second information recording layer 22, intermediate layer 23, and first information recording layer 24 are formed in turn on a substrate 21. Furthermore, a protection layer 25 is formed on the first information recording layer 24. A light beam 37 coming from the objective lens 115 strikes from the side of the protection layer 25, and is controlled to be in focus to the first or second information recording layer 24 or 22.

Upon recording/reproduction on/from the first information recording layer 24, not only light reflected by the first information recording layer 24 but also light reflected by the second information recording layer 22 enter the photodetector 117. Upon recording/reproduction on/from the second information recording layer 22, not only light reflected by the second information recording layer 22 but also light reflected by the first information recording layer 24 enter the photodetector 117.

Such multi-layered rewritable disk has a plurality of information recording layers, each of which has an embossed lead-in area including an embossed prepit train. The influence of the embossed prepit train included in the embossed lead-in area of a given layer on the other layer will be examined below.

Figure 5:
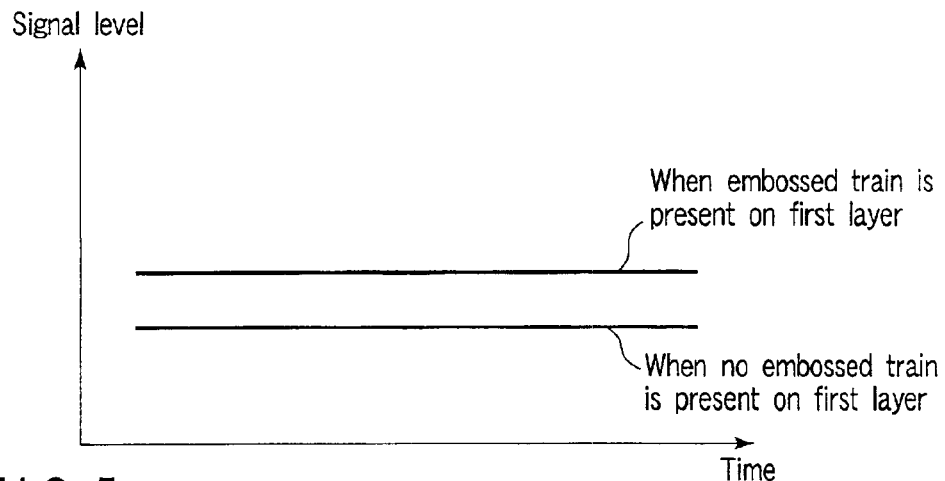
FIG. 5 is a graph showing the signal level difference between a reproduction signal obtained from an area where embossed lead-in areas of the respective information recording layers overlap each other, and a reproduction signal obtained from an area where they do not overlap each other.

FIG. 5 shows a reproduction signal obtained from the second information recording layer 22 (to be simply referred to as a second layer hereinafter) of the disk which has the first information recording layer 24 (to be simply referred to as a first layer hereinafter) and the second layer. FIG. 5 shows reproduction signals in two cases. In the first case, only tracks are formed at identical positions of the first and second layers (at overlapping positions viewed from the objective lens side), and neither an embossed portion nor phase change marks are formed. In the second case, at identical positions of the first and second layers, a track including an embossed prepit train is formed on the first layer, only a track is formed on the second layer, and neither an embossed portion nor phase change marks are formed. As can be seen from FIG. 5, even when the second layer under the same condition is reproduced, a reproduction signal suffers a level difference due to the influence of the first layer.

Figure 6:
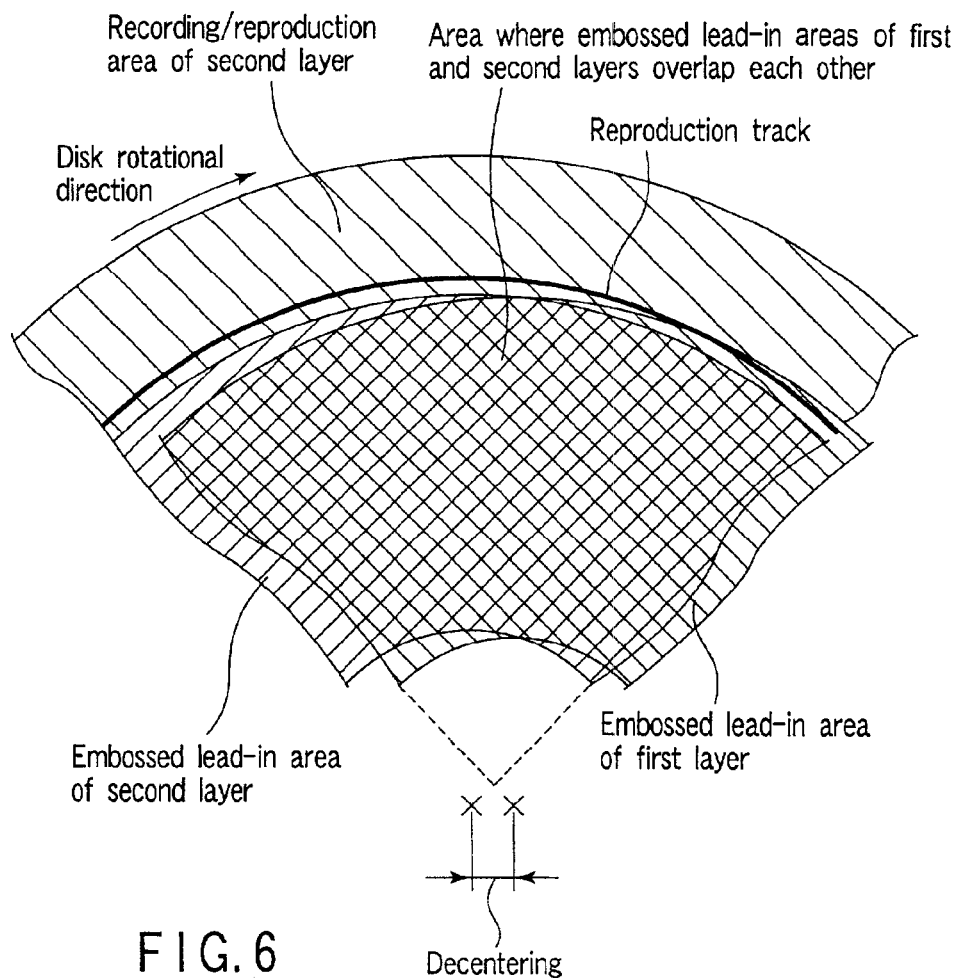
FIG. 6 is a view for explaining a problem which may be posed on the outer periphery side of the embossed lead-in area.

Assume that a disk has a data structure shown in FIG. 6. That is, each layer has an embossed lead-in area on the inner periphery side, and a rewritable data area on the outer periphery side of the lead-in area. Furthermore, the first layer (front side viewed from the objective lens side) and second layer (back side viewed from the objective lens side) suffer decentering (decentering errors).

Figure 7:
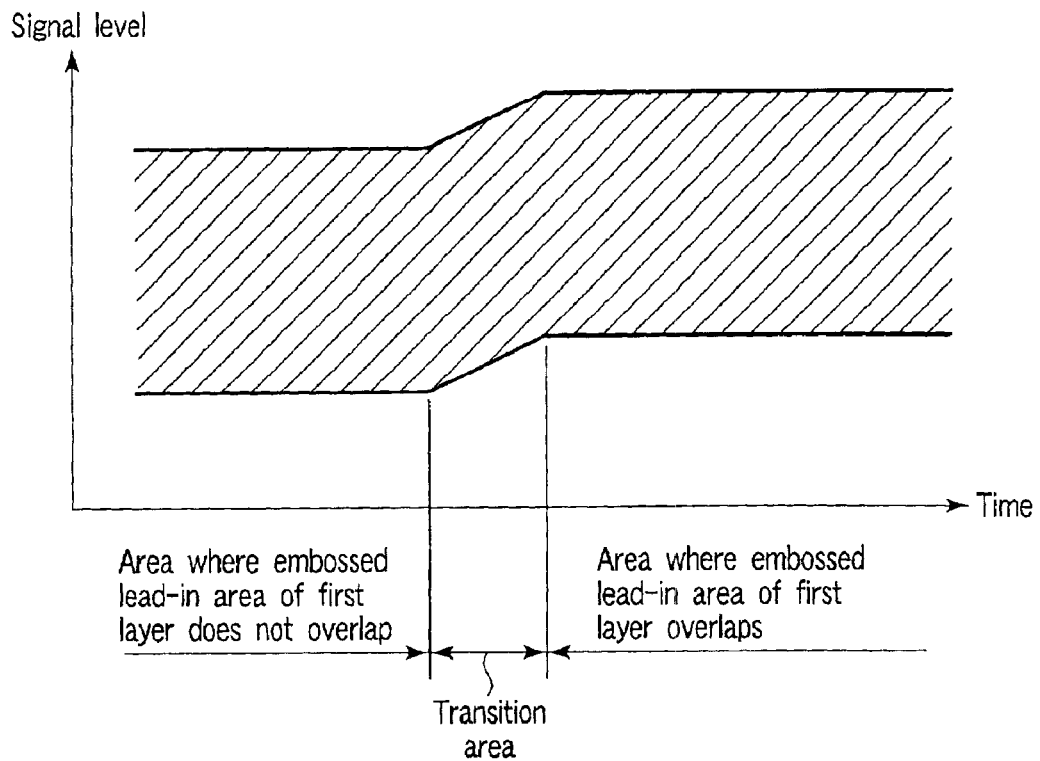
FIG. 7 is a view for explaining a problem which may be posed on the outer periphery side of the embossed lead-in area as in FIG. 6, and is a view for explaining HF signal errors which occur when embossed lead-in areas overlap each other and when they do not overlap each other.

FIG. 7 shows a reproduction signal level obtained upon reproducing a predetermined track on the second layer of the disk shown in FIG. 6. Assume that this predetermined track is, for example, the innermost one of the data area on the second layer. Upon being overlaid on the first layer, a portion where this predetermined track is present passes a portion that does not overlap the embossed lead-in area of the first layer, i.e., a portion that overlaps the data area. Another portion passes a portion that overlaps the embossed lead-in area of the first layer. Such phenomenon occurs since the first and second layers have decentering errors. As shown in FIG. 7, the level of the reproduction signal changes from a portion where the embossed lead-in areas of both the first and second layers do not overlap each other to a portion where they overlap each other via a transition period.

Figure 8:
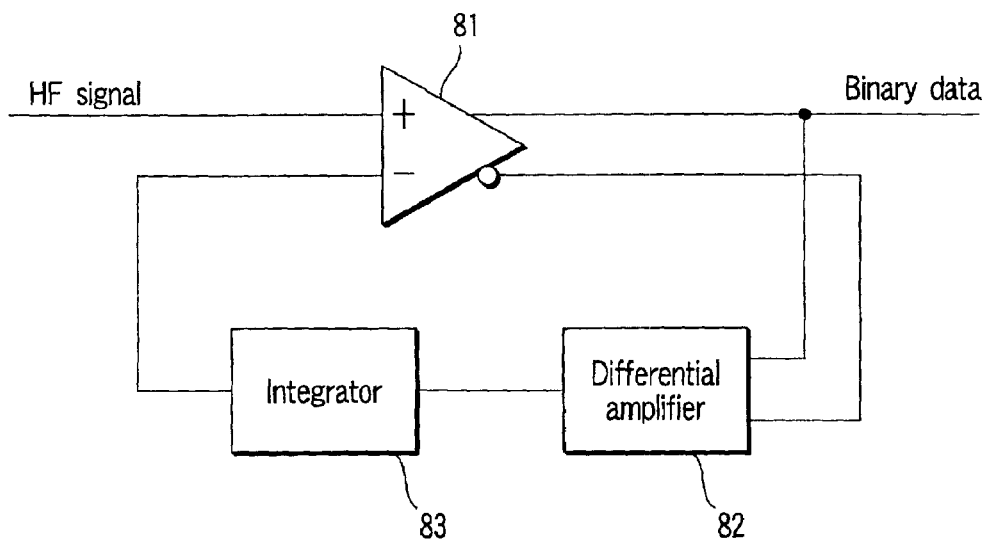
FIG. 8 is a schematic block diagram showing the arrangement of a binarization circuit used to binarize an HF signal.

FIG. 8 shows an example of a binarization circuit for binarizing a header field (HF) signal. This binarization circuit is included in the signal processing circuit 119 shown in FIG. 9.
This binarization circuit adopts a duty feedback arrangement for controlling a slice level to trace a level variation in a disk. An HF signal is input to the positive input of a comparator 81, and is binarized by being compared with a voltage input to the inverting input by the comparator 81. The output and inverted output of the comparator 81 are input to a differential amplifier 82. The output from the differential amplifier 82 is input to an integrator 83, the output of which is input to the inverting input of the comparator 81. The time constant of the integrator 83 is designed to trace a level variation in the disk without reacting to scratches, dust, and the like. The binarization circuit is arranged to trace a change in signal shown in FIG. 7. However, this circuit cannot trace an abrupt change. Hence, binarization errors occur during a change in signal level, and immediately after the signal level has changed. When such binarization errors occur, information cannot be normally reproduced. Such change in signal occurs upon reproduction of the first layer as that of the second layer.

To solve the aforementioned problems, an information recording medium according to an embodiment of the present invention has the following format.

Figure 1:
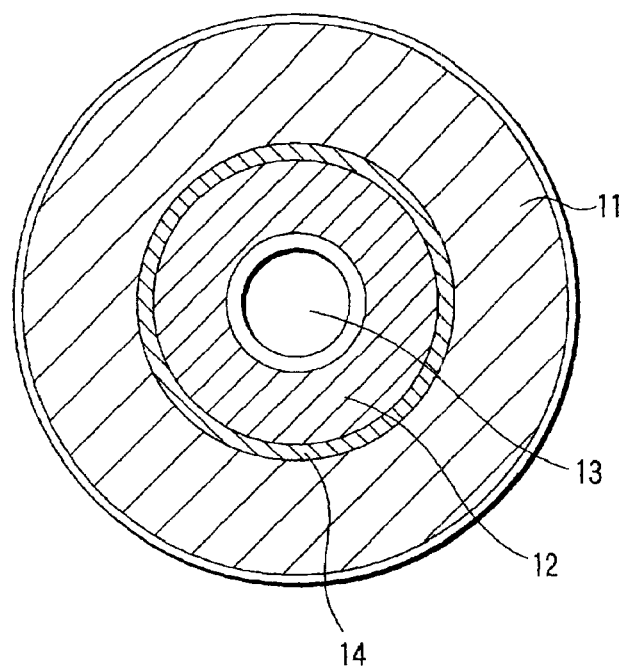
FIG. 1 shows an example of the format of an information recording medium.

FIG. 1 shows an example of the format of the information recording medium. This information recording medium has a central hole 13. Furthermore, this information recording medium has a plurality of disk-like information recording layers which are adhered to each other within an allowable decentering error range. Each information recording layer has a recording/reproduction area (data area) 11 and embossed lead-in area 12 at identical radial positions from the center.

The data area 11 neighbors the embossed lead-in area 12, and is located on the outer periphery side of this area. On the data area 11, spiral tracks are formed from the inner periphery side toward the outer periphery side. Furthermore, spiral tracks which are located within the range from the radial position of the innermost periphery of this data area 11 to a predetermined radial position toward the outer periphery side serve as guard tracks 14. That is, of the spiral tracks formed in the data area 11, spiral tracks on the inner periphery side serve as the guard tracks 14. Other tracks, i.e., tracks on the outer periphery side of the guard tracks 14 serve as data recording tracks. The spiral tracks are recorded with physical addresses by embossed pits at given intervals over the entire area. A phase change recording area is formed between neighboring physical addresses. No user data is recorded on the phase change recording area of the guard track 14. In other words, user data is inhibited from being recorded on the phase change recording area of the guard track 14. On the other hand, user data is recorded on the phase change recording area of the data recording track as needed.

The embossed lead-in area 12 is located at a predetermined radial position. On the embossed lead-in area 12, spiral tracks are formed by embossed pits. Physical addresses and lead-in data are recorded on the spiral tracks on the embossed lead-in area 12 by embossed pits.

Figure 10:
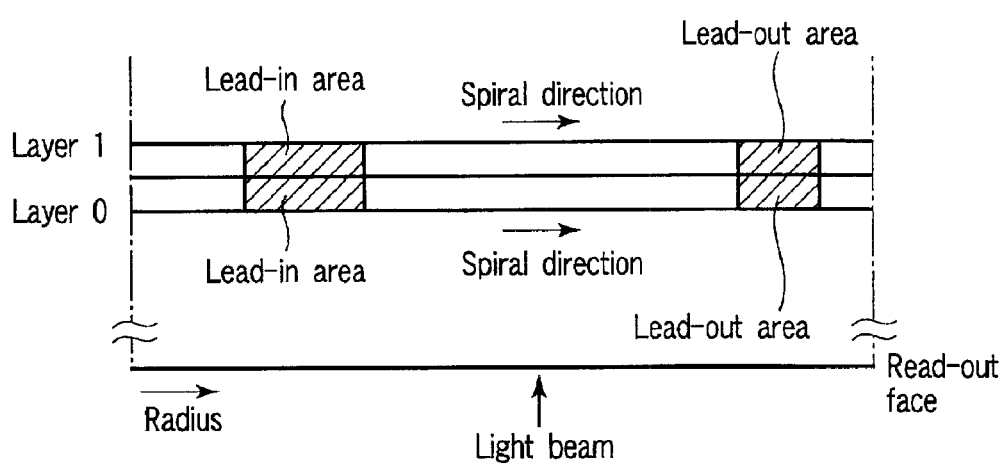
FIG. 10 is a view for explaining assignment of physical address data.

The physical address data recorded on the entire surface of the information recording medium will be explained below with reference to FIG. 10. Each information recording layer has an embossed lead-in area and data area, as described above. Furthermore, each information recording layer has an embossed lead-out area which neighbors the data area. This embossed lead-out area records the same data as those recorded on the embossed lead-in area.

Each information recording layer has spiral tracks including guard tracks from the inner periphery side toward the outer periphery side. That is, the spiral tracks are formed across the embossed lead-in area, data area, and embossed lead-out area. These spiral tracks are recorded with physical address data by embossed pits at given intervals. For example, there are two methods of assigning physical address data. In one method, physical address data are assigned from the inner periphery side toward the outer periphery side. That is, physical address data are assigned parallel to each other on the respective information recording layers. In the other method, physical address data are assigned from the inner periphery side toward the outer periphery side on one information recording layer, and they are assigned from the outer periphery side toward the inner periphery side on the other information recording layer. That is, physical address data are assigned in opposite directions on the respective information recording layers.

Figure 2:
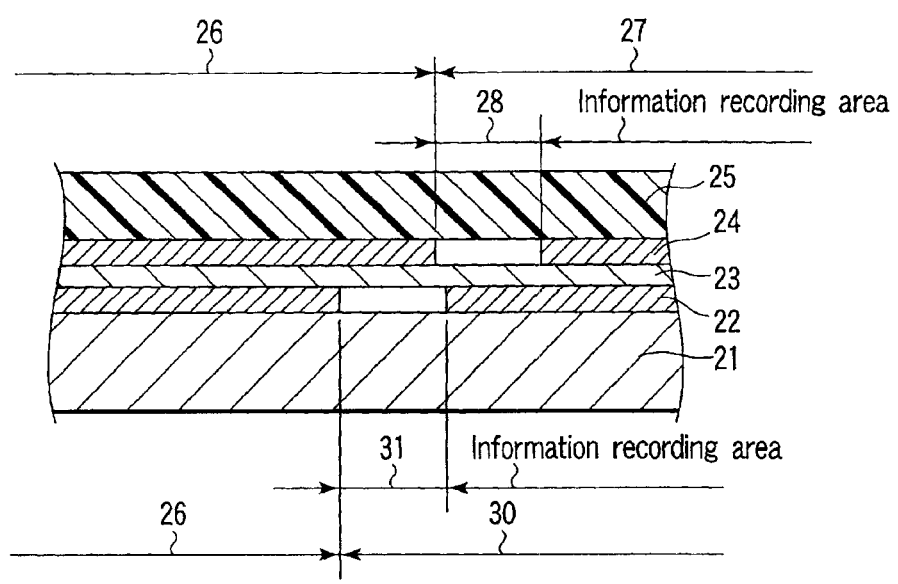
FIG. 2 is a sectional view showing an example of the information recording medium.
Figure 3:
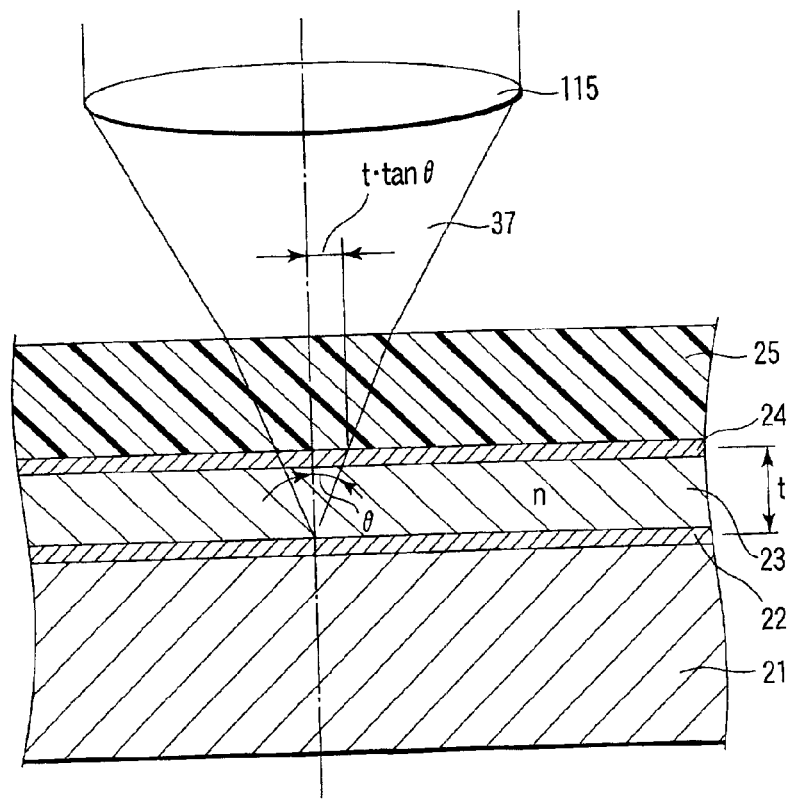
FIG. 3 is a view for explaining the radial distance of a light beam in the other information recording layer when the light beam is just in focus on one information recording layer of the information recording medium.

FIG. 2 is a sectional view of the information recording medium shown in FIG. 1. A second information recording layer 22 is formed on a substrate 21, a first information recording layer 24 is formed on the layer 22 via an intermediate layer 23, and a protection layer 25 is formed on the first information recording layer 24. A light beam (not shown) comes from the protection layer side. FIG. 2 shows a case wherein the first information recording layer 24 (to be simply referred to as a first layer hereinafter) and the second information recording layer 22 (to be simply referred to as a second layer hereinafter) are decentered. That is, the first and second layers are adhered within an allowable decentering range.

On the first layer, a first-layer recording/reproduction area (data area) 27 is formed adjacent to a first-layer embossed lead-in area 26. First-layer guard tracks 28 are formed within the range of a predetermined radial distance from the radial position of the innermost periphery of the first-layer recording/reproduction area 27 toward the outer periphery side. Data recording tracks on which user data are recorded are formed on the outer periphery side of the first-layer guard tracks. No user data are recorded on the first-layer guard tracks 28. That is, the first-layer guard tracks form an information recording-inhibited area. The recording/reproduction apparatus shown in FIG. 9 records user data on only the data recording tracks while excluding the first-layer embossed lead-in area 26 and first-layer guard tracks 28 from a recording target. Since no significant data are recorded on the first-layer guard tracks 28 in practice, they are also excluded from a reproduction target. That is, the recording/reproduction apparatus reproduces data from the first-layer embossed lead-in area 26 and data recording tracks.

Likewise, on the second layer, a second-layer recording/reproduction area (data area) 30 is formed adjacent to a second-layer embossed lead-in area 29. Second-layer guard tracks 31 are formed within the range of a predetermined radial distance from the radial position of the innermost periphery of the second-layer recording/reproduction area 30 toward the outer periphery side. Data recording tracks on which user data are recorded are formed on the outer periphery side of the second-layer guard tracks. No user data are recorded on the second-layer guard tracks 31. That is, the second-layer guard tracks form an information recording-inhibited area. The recording/reproduction apparatus shown in FIG. 9 records user data on only the data recording tracks while excluding the second-layer embossed lead-in area 29 and second-layer guard tracks 31 from a recording target. Since no significant data are recorded on the second-layer guard tracks 31 in practice, they are also excluded from a reproduction target. That is, the recording/reproduction apparatus reproduces data from the second-layer embossed lead-in area 29 and data recording tracks.

Since the first- and second-layer recording/reproduction areas (data areas) 27 and 30 have the above structure, an area (data recording tracks) where user data are actually recorded of one of the first- and second-layer recording/reproduction areas 27 and 30 never overlap embossed prepit trains on the other layer. With this structure, the level of the header field signal does not largely vary on the area where user data are recorded actually. Consequently, no slice error of the binarization circuit occurs.

Let x be the allowable decentering amount (allowable decentering error) of an optical information recording medium. Then, a deviation between the layers becomes-equal to or smaller than x. For this reason, the radial distance (area) where guard tracks are formed preferably has a distance (width) of at least x.

Let x be the allowable decentering amount of an optical information recording medium, and t be the physical distance between layers. Also, the objective lens used in recording/reproduction of information has NA (numerical aperture)=n·sin θ (n: the refractive index of an intermediate layer between the layers). At this time, the radius of a light beam 37 on the first layer while the light beam 37 is in focus on the second layer is given by t·tan θ. For this reason, the radial distance (area) where the guard tracks are formed preferably has a distance (width) of at least (x+t·tan θ).

Note that the radius of the light beam 37 on the second layer while the light beam 37 is in focus on the first layer is also given by t·tan θ.

With this arrangement, the demodulation circuit 120 of the information recording/reproduction apparatus shown in FIG. 9 can normally reproduce user data from the data recording tracks, any allowable decentering errors of which are absorbed by the guard tracks.

According to an embodiment of the present invention, the following information recording medium and information reproduction apparatus can be provided:

(1) an information recording medium which can absorb decentering errors of a plurality of information recording layers, and can prevent unstable reproduction due to the influence of decentering errors; and (2) an information reproduction apparatus which can accurately reproduce information without being influenced by decentering errors of a plurality of information recording layers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium comprising:
   a plurality of disk-like information recording layers which are adhered to each other within an allowable decentering error range,
   each of said information recording layers comprising:
   an embossed lead-in area which is located at a predetermined radial position and is recorded with lead-in data by embossed pits; and
   a data area which neighbors said embossed lead-in area, and is located on an outer periphery side of said embossed lead-in area, and
   said data area comprising:
   guard tracks which are formed within a range of a predetermined radial distance from a radial position of an innermost periphery of said data area toward an outer periphery side; and data recording tracks which are formed on the outer periphery side of said guard tracks and are used to record phase change recording marks that reflect user data, wherein if x represents the allowable decentering error, t represents a distance between said information recording layers, and n·sin θ (n: a refractive index of an intermediate layer formed between said information recording layers) represents a numerical aperture of an objective lens used in recording/reproduction for said information recording layers, the predetermined radial distance is (x+t·tan θ), and a defect caused by the allowable decentering error is covered by said guard tracks.

2. A medium according to claim 1, wherein said guard tracks include embossed pits that reflect physical address data.

* * * * *